United States Patent
Linck et al.

(10) Patent No.: US 6,932,732 B2
(45) Date of Patent: Aug. 23, 2005

(54) TOOTHED BELT WHEEL WITH A COLLAR

(75) Inventors: Ralf Linck, München (DE); Alois Wagner, Olching (DE); Norbert Beck, Neuching (DE); Markus Sperl, München (DE)

(73) Assignee: Giesecke & Devrient GmbH, Munich (DE)

( * ) Notice: Subject to any disclaimer, the term of this patent is extended or adjusted under 35 U.S.C. 154(b) by 99 days.

(21) Appl. No.: 10/258,115

(22) PCT Filed: Apr. 17, 2001

(86) PCT No.: PCT/EP01/04351

§ 371 (c)(1),
(2), (4) Date: Jan. 29, 2003

(87) PCT Pub. No.: WO01/81794

PCT Pub. Date: Nov. 1, 2001

(65) Prior Publication Data

US 2003/0148840 A1 Aug. 7, 2003

(30) Foreign Application Priority Data

Apr. 20, 2000 (DE) .......................................... 100 19 595

(51) Int. Cl.⁷ ............................ F16H 7/02; F16H 55/30; B21K 1/42
(52) U.S. Cl. ......................... 474/153; 474/152; 474/84; 29/892
(58) Field of Search .................... 474/87, 92, 152–156, 474/161–164, 205, 84, 140, 144, 116–117, 174–176; 59/98; 264/275, 328.8, 328.7; 29/892

(56) References Cited

U.S. PATENT DOCUMENTS

| | | | | |
|---|---|---|---|---|
| 3,650,158 A | * | 3/1972 | Van Huis | 474/152 |
| 3,807,247 A | | 4/1974 | Shiina | |
| 3,918,515 A | | 11/1975 | Shiina | |
| 4,425,007 A | * | 1/1984 | Soeteber | 474/901 |
| 4,634,410 A | * | 1/1987 | Tangorra et al. | 474/153 |
| 4,676,767 A | * | 6/1987 | Ahlgren | 474/84 |
| 4,722,722 A | * | 2/1988 | Rampe | 474/161 |
| 4,805,388 A | * | 2/1989 | Kell | 56/98 |
| 5,846,470 A | * | 12/1998 | Funatsu et al. | 264/275 |

FOREIGN PATENT DOCUMENTS

| | | | | |
|---|---|---|---|---|
| CH | 466 646 | | 1/1969 | |
| DE | (3124320) A1 | * | 1/1983 | 474/152 |
| FR | 2 520 466 | | 7/1983 | |
| GB | 1 220 262 | | 1/1971 | |
| JP | (64-12164) A | * | 1/1989 | 474/87 |
| JP | (09-177947) A | * | 7/1997 | F16H/55/06 |
| JP | (02-219617) A | * | 9/1999 | 264/328.1 |

* cited by examiner

Primary Examiner—Marcus Charles
(74) Attorney, Agent, or Firm—Bacon & Thomas, PLLC

(57) ABSTRACT

A cog belt pulley defining an axis of rotation having an outer circumferential surface oriented about the axis of rotation and including a plurality of teeth for engagement with at least one cog belt. The pulley is distinguished in having at least one flange segment radially extending from the outer circumferential surface. Each flange segment projects about a fraction of the circumferential surface and is located on an individual plane. The at least one flange segment is arranged for enabling a cog belt to be configured onto the pulley without interfering with the at least one of the flange segment.

10 Claims, 2 Drawing Sheets

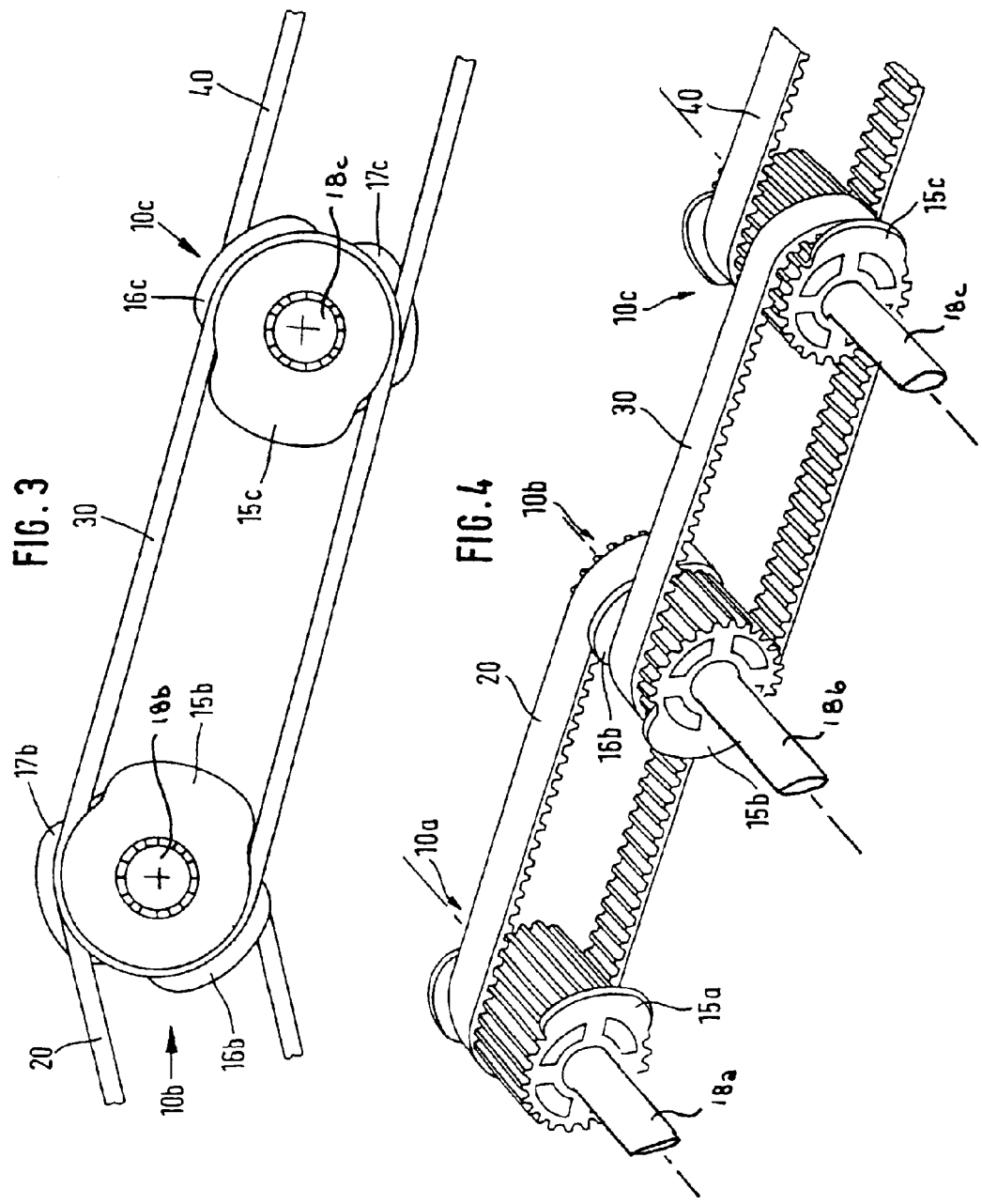

TOOTHED BELT WHEEL WITH A COLLAR

This application claims the benefit of German application 10 19 595.4 filed Apr. 20, 2000 and PCT application PCT/EP01/04351 filed Apr. 17, 2001.

BACKGROUND

This invention relates to a cog belt pulley with at least one flange, the pulley having a toothed circumferential surface for engagement of one or more cog belts. The invention relates in addition to a cog belt pulley system having a plurality of such cog belt pulleys.

Cog belt pulley systems are used in machines for coupling a plurality of spaced apart axles by means of cog belts so that one motor suffices for driving all coupled axles. The drive of more than two axles can be guaranteed by one cog belt by guiding said belt over a corresponding number of cog belt pulleys. However, a separate cog belt can also be provided per axle pair (cascade arrangement).

The flange for in particular preventing the belt from laterally slipping off the cog belt pulley during operation is usually formed by a flanged wheel disposed on one or both faces of the cog belt pulley. U.S. Pat. No. 3,918,515 and FR 2 520 466 A also disclose forming the flanged wheels of individual segments, the segments being distributed over the total circumference of the cog belt pulley.

However, the presence of the flanged wheels poses a problem during mounting and replacement of cog belts. Since the mounted belt requires an at least small pretension to guarantee reliable engagement with the pulley in operation even at high loads and high speeds. It is not readily possible to lay the belt easily on preassembled cog belt pulleys over the flanged wheels. This problem can be avoided by mounting the flanged wheel only after laying the belt on the pulley, or by swiveling the pulley into the operating position and locking it only after laying on the belt, or by using a belt with overlength and pretensioning it by means of a separate tension roller only after mounting it. These solutions involve considerable constructional effort, however.

In particular in relatively complex machines, such as bank note processors, in which numerous axles are coupled in cascade arrangement via a plurality of cog belts, the constructional effort of the machine and the maintenance effort for changing belts become extremely great.

SUMMARY

The problem of the present invention is therefore to propose a cog belt pulley and cog belt pulley system that both permit simple mounting of the belt and reliably prevent the belt from slipping off during operation.

To solve the problem it is proposed that the flange intended for preventing the belt from slipping off in operation be formed as a flange segment only over a limited part of the pulley circumference. When the pulleys of two axles to be coupled are rotated relative to each other so that the particular flange segments protruding beyond the pulley circumference face each other, the belt can be pushed onto the two pulleys over the flange segments without colliding with the flange segments.

This presupposes that the flange segment lengths in the circumferential direction of the pulleys are selected so that the flange segments are completely within the inside area of the belt, i.e. between load strand and return strand, when the belt is pushed on. At given angle of wrap $\alpha$ of a belt about a pulley, the flange segment can extend in the circumferential direction of the pulley over a clearance angle of 360° —$\alpha$ without collision occurring when the belt is pushed on. However, it must be heeded that the local radial height of the flange segment is adapted to the tangential course of the belt. In the case of equally large pulleys to be coupled, for example in connection with the drive of roller tracks, the flange segments should therefore extend over slightly less than 180° of the pulley circumference. However, if the diameters of two pulleys to be coupled are different (multiplication or reduction), the flange segment of the larger pulley extends over a smaller inscribed angle (for example 140° than the flange segment of the smaller pulley (for example 220°).

The invention thus offers the essential advantage that all pulleys can be preassembled and can remain that way when the belt or belts are mounted or replaced in the course of maintenance.

In the case of relatively complex machines with a large number of axles driven by one motor and interconnected in cascade arrangement, wherein two axles at a time are thus coupled by a separate cog belt, the mounting of the belts is effected in simple fashion by bringing the flange segments of two pulleys in mutually opposing positions by rotating the associated axles and pushing the belt onto the pulleys past the flange segments. In this way the complete belt cascade can be mounted successively.

In the case of a belt cascade, at least two belts run on the middle axles of the cascade in each case. For such cases it is advantageous if three flange segments are provided, one flange segment between two belts and one flange segment on each side of the belts, that are mutually offset by 120° in the circumferential direction. A belt pushed onto the pulleys in the above-described way can be pushed further past the middle flange segment into the back position, that is, onto the back pulley, when the associated axle is rotated by 120°.

More than two belts can also run on one axle, whereby an accordingly larger number of flange segments distributed evenly over the circumference is to be provided. In the case of n belts, n flanged wheels (flanged wheel limiting on one side) or n+1 flanged wheels (flanged wheels limiting on both sides) are preferably provided that are mutually offset by 360°/n or 360°/(n+1) in the circumferential direction.

The invention is likewise employable in cog belt pulley systems in which one belt is guided over more than two pulleys.

According to a preferred embodiment of the invention, the flange segments are beveled toward the pulley. This ensures that the belts do not run onto a flange segment and slip or even break in operation, but are instead pushed back onto the pulley.

The inventive flanged cog belt pulley can be executed advantageously as an integral component, for example an injection molded part. Alternatively, the flange segment can be executed as a separate component that is mounted on the pulley, for example screwed on its face, or slipped onto the axle adjacent to the pulley.

BRIEF DESCRIPTION OF THE DRAWINGS

The invention will be explained in the following by way of example with reference to the accompanying drawings, which indicate further advantages and aspects of the invention.

FIG. 3 shows a side view of a cog belt pulley system in cascade arrangement according to the invention; and FIG. 4 shows a perspective view of a cog belt pulley system in cascade arrangement according to the invention.

FIG. 4 shows a cog belt pulley system with three pulleys 10a, 10b, 10c that are coupled in cascade arrangement over belts 20, 30, 40 by two pulleys 15a, 15b or 15b, 15c being driven over common belt 20 or 30 in each case.

DETAILED DESCRIPTION OF VARIOUS EMBODIMENTS

Figure 1:
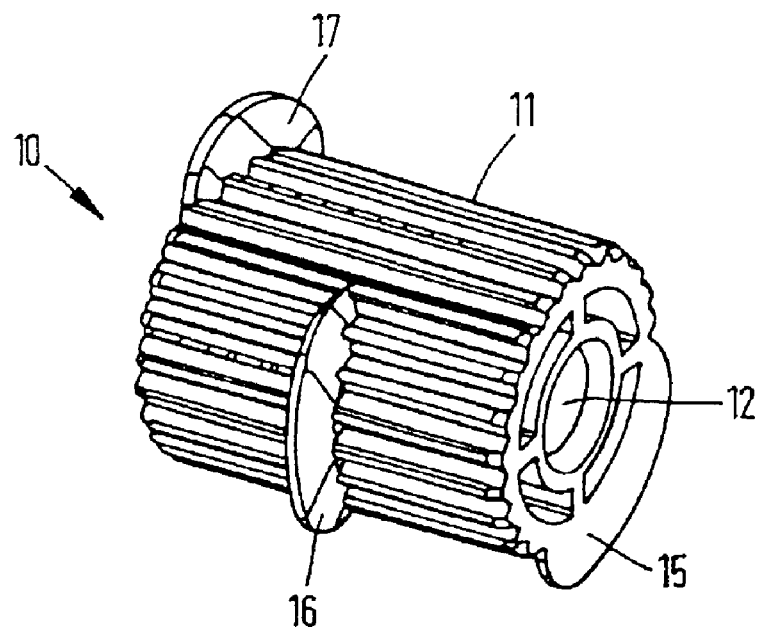
FIG. 1 shows in perspective an inventive cog belt pulley with integrated flange segments.
Figure 2:
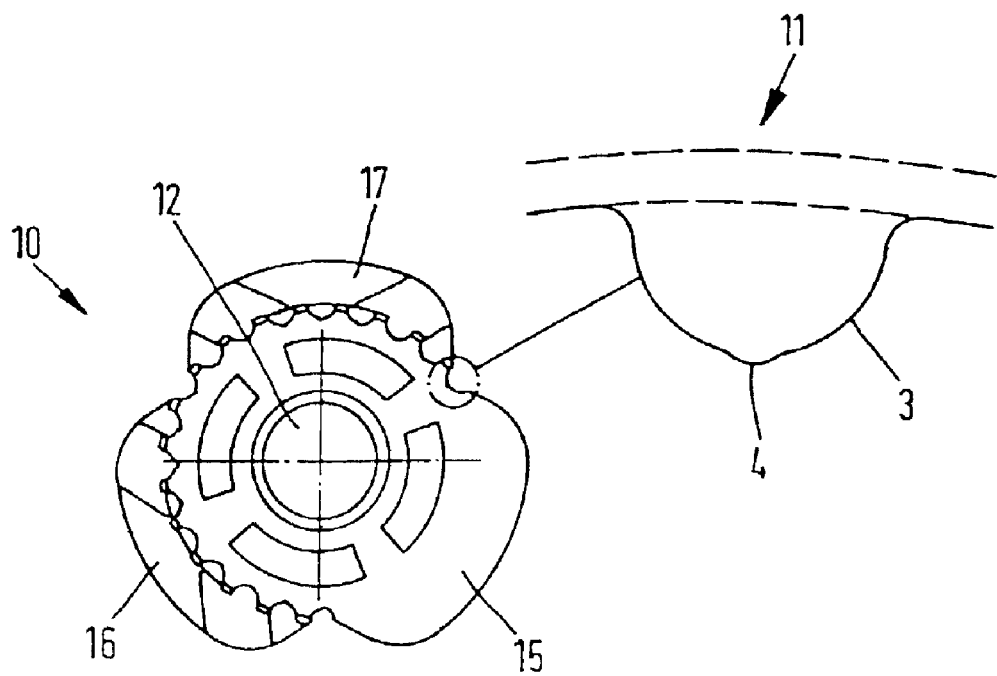
FIG. 2 shows a side view of the cog belt pulley according to FIG. 1.

Pulley 10 corresponding to pulleys 10a to 10c is shown in perspective in FIG. 1 and in a side view in FIG. 2. Pulley 10 has toothed circumferential surface 11 and flange segments 15, 16, 17 integrally formed on pulley 10 as well as central axle bore 12. It can be produced in this form as an integral component by injection molding.

Flange segments 15 to 17 rise in the radial direction beyond toothed circumferential surface 11 and prevent lateral displacement of the belts circulating on the pulley. Pulleys 10 shown in the figures are intended for circulation of two belts, with middle flange segment 16 serving as a spacer between the belts. Outer flange segments 15, 17 have the function of preventing the belt from slipping off toothed circumferential surface 11 during operation. Instead of one integral component, as shown in FIG. 1, the same pulley complex can also be realized by two separate pulleys separated from each other by a flange segment and equipped laterally with a further flange segment in each case.

The detail of pulley 10 shown enlarged in FIG. 2 shows in a detail an area between two teeth of toothed circumferential surface 11. At base 3 of the teeth groove 4 is provided that serves to reduce noise arising during operation of pulley 10 with a belt. Noise reduction is obtained by compressed air being able to escape via grooves 4. Compressed air arises during operation when the teeth of the belt and pulley 10 mesh.

In the case shown in FIG. 1 of pulley 10 intended for two belts and therefore having three flange segments 15 to 17, the flange segments are spaced apart by 120° over the circumference, as illustrated in FIG. 2. A reason for this is that uniform mass distribution should preferably avoid balance errors. Accordingly, an angular spacing of the flange segments of 360°/n over the pulley circumference results quite generally for a pulley with n flange segments. The angular spacing also results from the one-sided mounting of belts located one behind the other as described below.

FIGS. 3 and 4 show a pulley system with cascade coupling. That is, two belts 20, 30, 40 run on each axle 18a, 18b, and 18c and there are accordingly three flange segments 15b to 17b or 15c to 17c for each axle 18b, and 18c that are associated with pulleys 10b and 10c. The root diameter is identical for both pulleys 10b, 10c, so that load strand and return strand of belt 30 extend parallel to each other. Flange segments 15b and 15c extend starting out from the root circle of pulley 10 so as to be capable of being guided between load strand and return strand of belt 30. That is, flange segments 15b and 15c extend over somewhat less than 180° of the root circle of pulley 10b or 10c. In the embodiment shown in FIG. 3, the area where belt 30 is not guided laterally by any of flange segments 15b and 15c includes only about 2° to 3°.

Mounting belt 30 on pulleys 10b and 10c is very simple due to the special design of flange segments 15b, 15c. Before belt 30 is pushed laterally onto pulleys 10b, 10c, pulleys 10b, 10c are rotated into the position shown in FIG. 3 where their outer flange segments 15b, 15c face each other so that the flange segments lie between load strand and return strand of belt 30. It is then readily possible to push belt 30 past flange segments 15b, 15c. In operation, that is, when pulleys 10b, 10c are rotating, the belt is guided laterally by flange segments 15b, 15c virtually continuously, apart from a negligibly small area of about 2 to 3°. In order to prevent belt 30 from running onto flange flange segments 15b, 15c during this short time period, the inside flanks of flange segments 15b, 15c slope toward toothed circumferential surface 11 (not shown). This ensures that belt 30, should it slip, is pushed back onto the pulley.

The pulley systems are normally only accessible on one side, so that the belts are pushed onto the pulleys one after the other, beginning with the rearmost belt. This will be explained in the following with reference to FIG. 4.

First, belts 20 and 40 are pushed onto pulleys 10a, 10b and 10c. In the case of belt 40 this is done in a position of pulley 10c as shown in FIG. 4. Belt 20 is also first pushed onto pulleys 10a, 10b in the position in which pulleys 10a, 10b are shown in FIG. 4, that is, with outer flange segments 15a, 15b facing inside or each other. Pulley 10b is then rotated counterclockwise by 120° so that middle flange segment 16b now faces inside. Simultaneously, pulley 10a likewise rotates counterclockwise due to the pulley coupling, so that associated middle flange segment 15b, which is not visible in the perspective view of FIG. 4, likewise faces inside and is opposite flange segment 16b. In this state, belt 20 can be pushed over middle flange segments 16a, 16b into the back position as shown in FIG. 4. Finally, belt 30 is mounted by rotating hitherto uncoupled pulleys 10b and 10c so that their outer flange segments 15b, 15c face each other (as shown in FIG. 3; rotated by 180° in each case over the position shown in FIG. 4). Belt 30 can then be easily pushed on, thereby completing the cascade pulley system.

Besides the shown pulley for two belts, pulleys with flange segments can also be designed for one or more than two belts. If the pulley is used for more than two belts, it may be helpful for mounting to reduce the size of the flange segments in the circumferential direction.

The rearmost flange in terms of mounting can be designed as a complete flanged wheel, since the belt is usually not pushed beyond this position.

The inventive cog belt pulleys can also be used in gear systems in which a cog belt is guided over more than two pulleys. The size of the flange segments in the circumferential direction can then be enlarged.

What is claimed is:

1. A cog belt pulley having an axis of rotation, comprising:

an outer circumferential surface oriented about the axis of rotation and comprising a plurality of teeth for engagement with at least one cog belt; and a plurality of flanges radially extending from the outer circumferential surface, each of the flanges projecting from the outer circumferential surface and located on an individual plane generally perpendicular to the axis of rotation of the pulley;

wherein the individual planes of the flanges are offset relative to one another along the axis of rotation of the pulley, at least one of the flanges being formed as a flange segment projecting from only a fraction of the outer circumferential surface for enabling a cog belt to be pushed past the flange segment at right angles relative to the circumferential direction of the pulley without interfering with the flange segment.

2. The cog belt pulley according to claim 1, wherein each flange segment projects less than 180° from the outer circumferential surface along the individual plane thereof.

3. The cog belt pulley according to claim 1, wherein each flange segment is beveled in slope toward the outer circumferential surface.

4. The cog belt pulley according to claim 1, wherein the pulley includes at least two flange segments with an intermediate toothed circumferential surface provided therebetween.

5. The cog belt pulley according to claim 1, wherein the pulley includes at least three flange segments with intermediate toothed circumferential surfaces provided therebetween.

6. A cog belt pulley according to claim 5, wherein the at least three flange segments are mutually offset by 120° about the axis of rotation.

7. A cog belt pulley according to claim 1, wherein the cog belt pulley is formed as an integral single piece component.

8. A cog belt pulley according to claim 7, wherein the integral single piece component is an injection molded part.

9. A cog belt pulley according to claim 1, wherein a depression is formed at the base of each tooth of the cog belt pulley.

10. A cog belt pulley system, comprising:
at least two axles each having at least one cog belt pulley, the at least one cog belt pulley including an outer circumferential surface comprising a plurality of teeth for engagement with at least one cog belt, a plurality flanges radially extending from the outer circumferential surface, each of the flange flanges projecting from the circumferential surface and located on an individual plane generally perpendicular to an axis of rotation of the at least one cog belt pulley and offset relative to one another along the axis of rotation; and at least one cog belt;

wherein at least two of the flanges are formed as flange segments projecting from a fraction of the circumferential surface of the pulleys, the flanges are coupled via the cog belt and are arranged to face each other in such a relative axle angle position that the belt is positioned to be pushed past the flange segments at right angles relative to the circumferential direction of the pulleys.

* * * * *